United States Patent
Wang et al.

(10) Patent No.: US 9,943,807 B2
(45) Date of Patent: Apr. 17, 2018

(54) SPIRAL WOUND MEMBRANE WITH BI-DIRECTIONAL PERMEATE FLOW

(76) Inventors: Chen Wang, ShangHai (CN); Chang Wang, ShangHai (CN)

(*) Notice: Subject to any disclaimer, the term of this patent is extended or adjusted under 35 U.S.C. 154(b) by 924 days.

(21) Appl. No.: 14/345,750

(22) PCT Filed: Sep. 19, 2011

(86) PCT No.: PCT/CN2011/001580
§ 371 (c)(1),
(2), (4) Date: Aug. 15, 2014

(87) PCT Pub. No.: WO2013/040722
PCT Pub. Date: Mar. 28, 2013

(65) Prior Publication Data
US 2015/0157985 A1    Jun. 11, 2015

(51) Int. Cl.
*B01D 63/10* (2006.01)
*B01D 61/02* (2006.01)
*B01D 61/14* (2006.01)

(52) U.S. Cl.
CPC ......... *B01D 63/106* (2013.01); *B01D 61/025* (2013.01); *B01D 61/027* (2013.01); *B01D 61/145* (2013.01); *B01D 61/147* (2013.01); *B01D 63/103* (2013.01); *B01D 2313/04* (2013.01); *B01D 2313/143* (2013.01); *B01D 2313/146* (2013.01); *B01D 2313/23* (2013.01)

(58) Field of Classification Search
None
See application file for complete search history.

(56) References Cited

U.S. PATENT DOCUMENTS

| | | | | |
|---|---|---|---|---|
| 3,386,583 A | * | 6/1968 | Merten | B01D 63/10 210/321.83 |
| 4,814,079 A | | 3/1989 | Schneider | |
| 4,861,487 A | | 8/1989 | Fulk, Jr. | |
| 5,128,037 A | * | 7/1992 | Pearl | B01D 61/10 210/321.74 |

(Continued)

FOREIGN PATENT DOCUMENTS

| | | |
|---|---|---|
| CN | 1274298 A | 11/2000 |
| JP | 2005211790 A | 8/2005 |

(Continued)

OTHER PUBLICATIONS

Mark Rizzone: "An Ultrafiltration Solution", PCT Painting & Coatings Industry.

(Continued)

*Primary Examiner* — Krishnan S Menon

(57) ABSTRACT

Disclosed is a spiral wound membrane element that provides two permeate streams through a permeate carrier sheet. The spiral wound membrane element is sealed such that the only communication with the permeate carrier is through a membrane sleeve. The first permeate stream flows spirally inward and the second permeate stream flows in the opposite direction, spirally outward. The permeate carrier sheet is sealed at two edges so that the permeate streams can only discharge from opposite, unsealed edges of the permeate carrier sheet. The first permeate stream may be collected in a central collection tube and the second permeate stream may be collected in a peripheral region of the membrane element.

12 Claims, 5 Drawing Sheets

(56) References Cited

U.S. PATENT DOCUMENTS

| | | | |
|---|---|---|---|
| 5,250,118 A | 10/1993 | Netwig et al. | |
| 5,275,726 A | 1/1994 | Feimer et al. | |
| 5,817,235 A | 10/1998 | Tortosa | |
| 6,533,937 B1* | 3/2003 | Adachi | B01D 61/02 210/257.2 |
| 6,656,362 B1 | 12/2003 | Kihara et al. | |
| 7,396,463 B2 | 7/2008 | Moller | |
| 7,410,581 B2 | 8/2008 | Arnold et al. | |
| 7,563,375 B2 | 7/2009 | Liberman | |
| 2003/0127388 A1 | 7/2003 | Ando et al. | |
| 2008/0302719 A1* | 12/2008 | Chikura | C02F 1/44 210/497.1 |
| 2009/0120873 A1 | 5/2009 | Becker et al. | |
| 2009/0255877 A1* | 10/2009 | Bair | B01D 63/10 210/739 |
| 2009/0314713 A1 | 12/2009 | Shelby et al. | |
| 2010/0326910 A1 | 12/2010 | van der Padt et al. | |

FOREIGN PATENT DOCUMENTS

| | | |
|---|---|---|
| JP | 2006218345 A | 8/2006 |
| JP | 2009220070 A | 10/2009 |
| TW | 200301152 A | 7/2003 |
| WO | 0027511 A1 | 5/2000 |
| WO | 2005070524 A1 | 8/2005 |

OTHER PUBLICATIONS

Taiwan Office Action issued in connection with corresponding TW Application No. 101133382 dated Jan. 19, 2017.

International Search Report and Written Opinion dated Jun. 28, 2012 which was issued in connection with PCT Patent Application No. PCT/CN2011/001580 which was filed on Sep. 19, 2011.

Bartelsa et. al.: "Performance Advancement in the Spiral Wound next Term RO/NF Element Design", Desalination, Mar. 1, 2008, vol. 221, Issue 1-3, pp. 207-214.

PCT Search Report and Written Opinion issued in connection with related PCT Application No. PCT/CN2012/074256 dated Jan. 31, 2013.

European Search Report and Opinion issued in connection with related EP Application No. 12874399.4 dated Nov. 17, 2015.

European Search Report and Opinion issued in connection with related EP Application No. 12874399.4 dated May 27, 2016.

U.S. Non-Final Office Action issued in connection with related U.S. Appl. No. 14/395,112 dated Sep. 30, 2016.

Taiwan Office Action issued in connection with related TW Application No. 102112404 dated Oct. 24, 2016.

U.S. Final Office Action issued in connection with related U.S. Appl. No. 14/395,112 dated Jun. 6, 2017.

* cited by examiner

SPIRAL WOUND MEMBRANE WITH BI-DIRECTIONAL PERMEATE FLOW

FIELD

The present disclosure relates generally to spiral wound membrane elements and modules.

BACKGROUND

The following discussion is not an admission that anything discussed below is citable as prior art or common general knowledge.

A spiral wound membrane element is typically made by wrapping one or more membrane leaves and feed spacer sheets around a perforated central tube. The membrane leaves each have a permeate carrier sheet placed between two generally rectangular membrane sheets. The membrane sheets are typically sealed together along three edges. The fourth edge of the leaf is adjacent to the central tube and open to the perforations. One or more layers of permeate carrier sheet can also be wrapped around the central tube to support the membrane leaf over the perforations in the central tube and to provide a flow path between the edge of the leaf and the central tube. An anti-telescoping device (ATD) is attached at the ends of the membrane element to prevent telescopic unraveling of the membrane element.

Feedstock, also referred to as feed water, is introduced at one end of the membrane element and flows through the feed spacer sheets and along the surface of the membrane sheets. Some of the feedstock passes through the membrane sheets to form a permeate stream. The remainder of the feedstock, referred to as the reject, retentate or brine stream, flows through the feed spacer sheets and out of the outlet end of the membrane element. The permeate stream flows along the permeate carrier in a inwardly spiraling flow. The permeate stream follows the permeate carrier until reaching and exiting the fourth edge of the leaf and entering the central tube. Within the central tube, the permeate stream is collected and transported towards an outlet end of the central tube.

The throughput or collection rate of permeate in a spiral wound membrane is related to the pressure applied across the membrane. However, the pressure required to drive the permeate flow through the permeate carrier, including from the edges of the permeate carrier, towards the central tube reduces the net driving pressure for permeate flow through the membrane.

SUMMARY

A spiral wound membrane element, to be described in further detail below, provides two streams of permeate that flow in opposite directions around a central tube.

The first permeate stream flows spirally inward and the second permeate stream flows spirally outward. The first permeate stream is collected in the central tube and the second permeate stream is collected from a peripheral region of the membrane element. Optionally the second permeate stream, after collection, can be transported to the central tube.

The spiral wound membrane element includes a wrapping of one or more membrane sleeves and one or more permeate carriers around a perforated central tube. For the purposes of this disclosure, the term membrane sleeve shall refer to a sleeve of one or more membrane sheets that surround a feed spacer, with the membrane sleeve being sealed at two edges.

The feedstock may flow through the unsealed, or open edges of the feed spacer and over the surface of the membrane sheets. A permeate carrier sheet is positioned between two membrane sleeves. The permeate carrier sheet has two open edges and two sealed edges. The sealing arrangement of the membrane sleeve and the permeate carrier sheet allows the permeate flowing through the permeate carrier to split into two permeate streams. One permeate stream is carried along the permeate carrier spiraling in an inward direction toward the central tube. The second permeate stream may be carried along the permeate carrier spiraling outward, to be collected in the peripheral region of the membrane element.

Optionally, the spiral wound membrane element also includes at least one anti-telescoping device that is positioned at one end of the membrane element to prevent the telescopic unraveling of the membrane element. The ATD may include a flow passage that communicates permeate from the second permeate stream to the central tube.

The spiral wound membrane element may be used with pressure vessels commonly used with spiral wound membrane elements, or may be retrofitted into one existing spiral wound membrane system.

Without being bound by theory, the bifurcation of permeate fluid flow between the first permeate stream and the second permeate stream may depend upon the permeate fluid following the path of least resistance. By dividing a given flow of permeate fluid between two flow paths, the maximum rate of flow on the permeate side of the membrane may be reduced. Further, the bifurcation of the permeate stream also assists in shortening the distance that permeate travels to exit the permeate carrier by traveling either to the central tube or to the peripheral region of the membrane element. This decreased maximum rate of flow and length of travel can decrease the head loss across the permeate carrier, thus increasing the net driving pressure across the membrane.

DETAILED DESCRIPTION

The present disclosure describes a spiral wound membrane element that provides two permeate streams. The first permeate stream flows spirally inward to be collected within a central tube of the membrane element. The second permeate stream flows in the opposite direction, spirally outward to be collected from a peripheral region of the membrane element.

Figure 1:
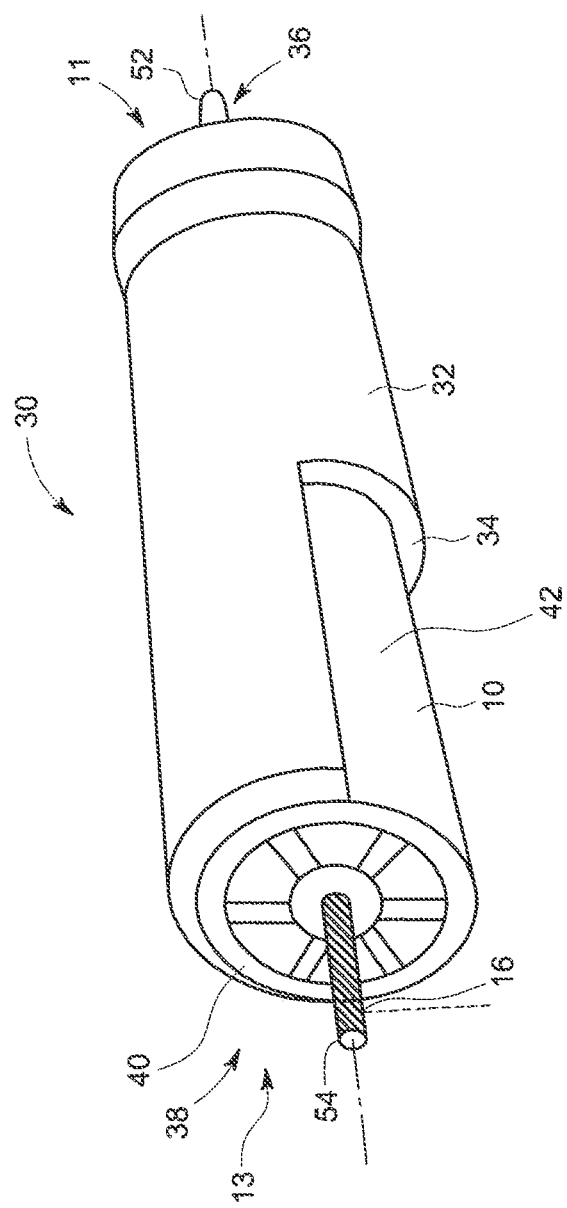
FIG. 1 is a partial cut-away, perspective view of a spiral wound membrane element.
Figure 2:
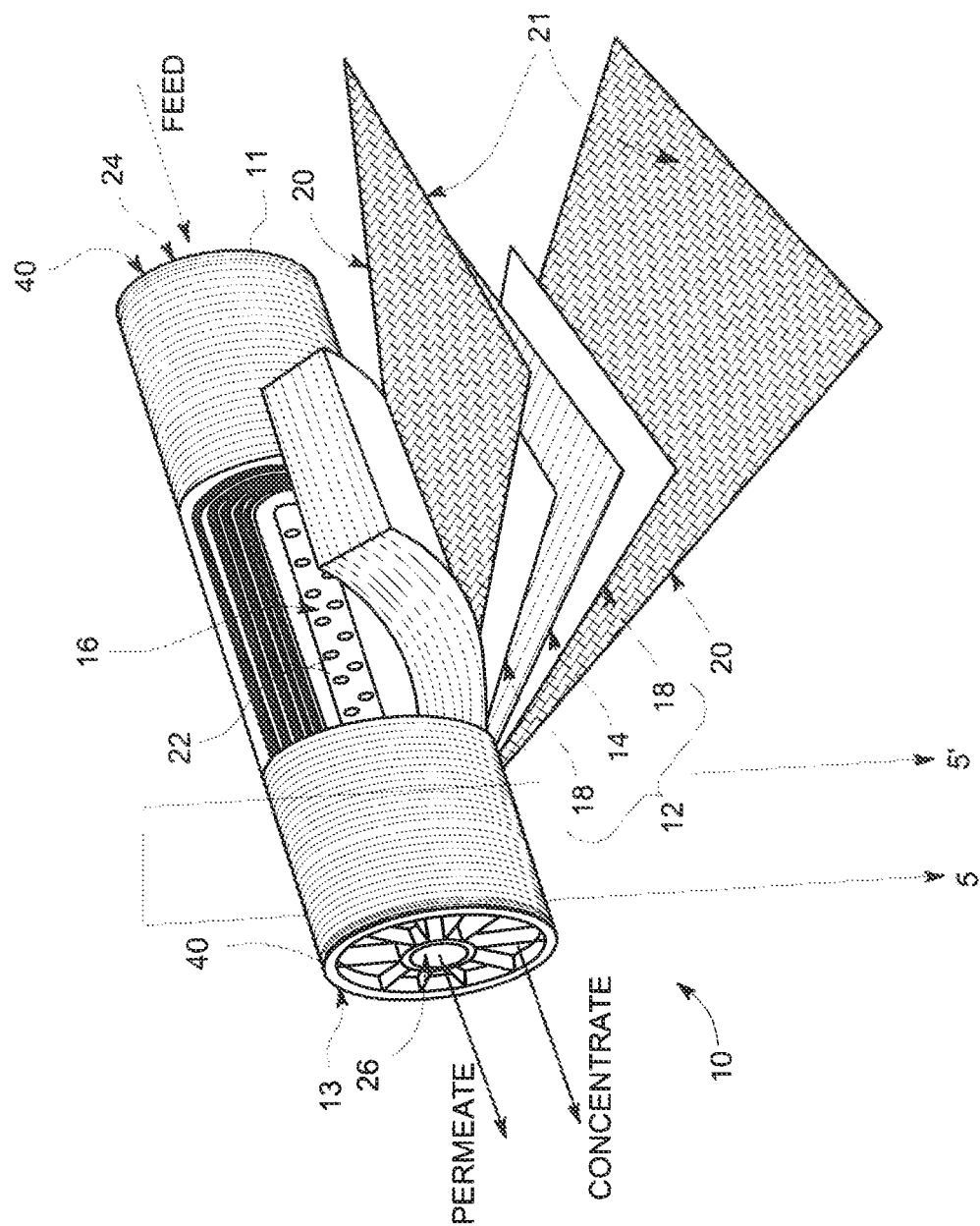
FIG. 2 is a partial cut-away, perspective view of a spiral wound membrane element.

Referring to FIGS. 1 and 2, a spiral wound membrane element 10 has an input end 11 and an output end 13. Element 10 may be formed by wrapping one or more membrane sleeves 12 and permeate carrier sheets 20 around a perforated central tube 16. The central tube 16 may also be called a core, a permeate tube or a produced water collection tube. The central tube 16 has a feedstock end 24 and a concentrate end 26. The perforations of the central tube 16 may comprise a plurality of small holes 22. The holes 22 have a diameter of approximately 0.125 inches (3.2 mm) and provide fluid communication to the inside of the central tube 16.

Figure 3:
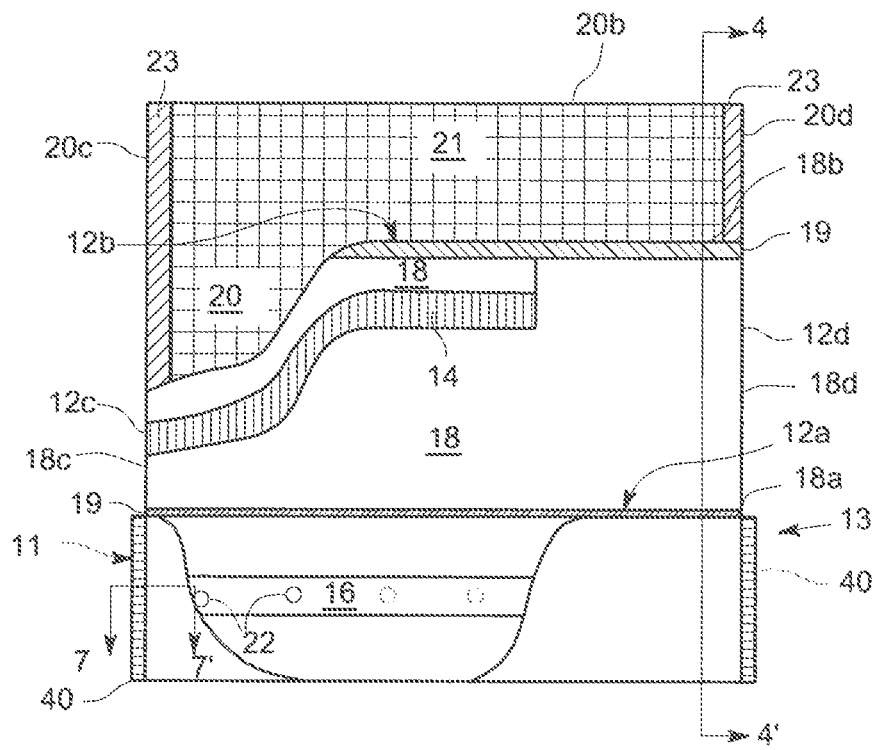
FIG. 3 is a partial cut-away, top plan view of a membrane sleeve and permeate carrier for use in the membrane element of FIG. 1.
Figure 4:
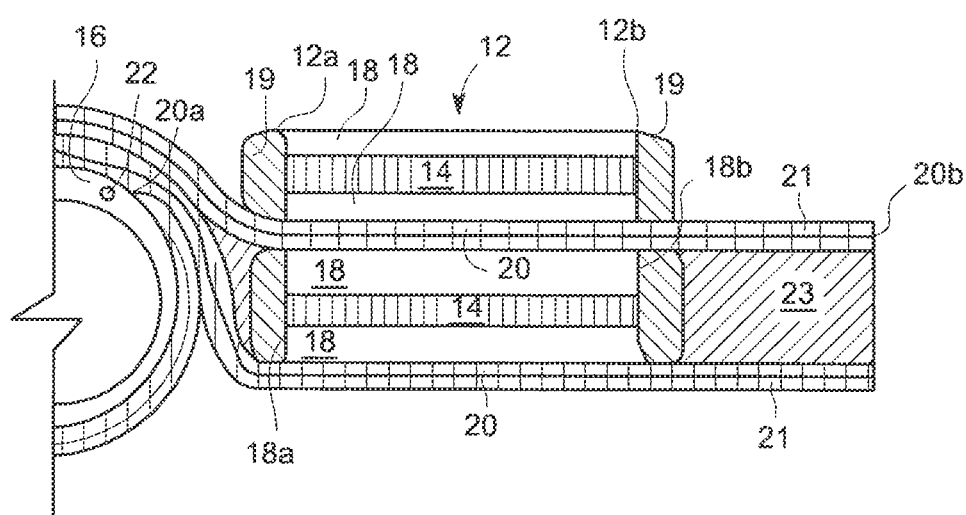
FIG. 4 is a cross-sectional view of a membrane sleeve taken through line 4-4' of FIG. 3.

As shown in FIGS. 2, 3 and 4, each membrane sleeve 12 includes two membrane sheets 18 with a feed spacer 14 between them. To form the membrane sleeve 12, the membrane sheets 18 have two sealed edges 18a and 18b that may be substantially parallel to each other. Edge 18a may be substantially parallel to and positioned adjacent to the central tube 16, as shown in FIG. 3. The sealed edges 18a and 18b are sealed, between the two membrane sheets 18, by a seal 19, to form closed edges 12a and 12b of the membrane sleeve, as shown in FIG. 3 and FIG. 4. A variety of materials known in the art are suitable to be used as the seal 19, such as a glue line, provided seal 19 does not permit fluid communication across edges 12a and 12b. Each membrane sleeve 12 also includes two open edges 12c and 12d that are substantially perpendicular to edges 12a and 12b. The feed spacer 14 is positioned within the membrane sleeve 12 and between the two membrane sheets 18 so that an inner surface of each membrane sheet 18 is adjacent the feed spacer 14. The feed spacer 14 is in fluid communication with the input end 11 and the output end 13 of the membrane element 10.

The sealed edges 18a and 18b of the membrane sheets 18, with the feed spacer 14 therebetween, form the membrane sleeve 12 with closed edges 12a and 12b and open edges 12c and 12d.

The feed spacer 14 acts as a conduit for feed solution to flow through the membrane sleeve 12 and across the inner surface of the membrane sheets 18. The feed stock can generally flow from input end 11 to output end 13 of element 10, flowing between the open edges of the membrane sleeve 12.

The membrane sheets 18 have a separation layer cast onto a supporting or backing layer. The separation layer may be, for example, cellulose acetate, a polyamide, a thin film composite or other materials that may be formed into a separation membrane. The separation layer may have pores, for example, in the reverse osmosis, nanofiltration or ultrafiltration range so that the desired molecules from the feedstock may pass through the membrane sheet 18 and enter into a permeate stream.

The permeate carrier sheet 20 is generally rectangular with open edges 20a and 20b that are substantially parallel to closed edges 12a and 12b of the membrane sleeve 12. The permeate carrier sheet 20 also has two closed edges 20c and 20d of permeate carrier sheet that are substantially parallel to the open edges 12c and 12d of the membrane sleeve 12. Closed edges 20c and 20d are sealed by a seal 23. A variety of materials known in the art are suitable to be used as the seal 23, such as a glue line, provided seal 23 does not permit fluid communication across the permeate carrier sheet at the edges 20c and 20d. It is understood that the glue may saturate between adjacent membrane sleeve 12 and seal 23 may generally extend about 1 to 5 cm from edges 20c and 20d of the permeate carrier sheet.

FIG. 4 shows the permeate carrier sheet 20 positioned between two membrane sleeves 12 and a second permeate carrier below. At edge 20a, the permeate carrier sheet 20 is in fluid communication with small holes 22 in the central tube 16. An additional permeate carrier sheet, which might or might not be the same material as the permeate carrier sheet 20 in the membrane sleeves 12, or an extension of the permeate carrier sheet 20, can be wrapped around the central tube 16 in one or more layers before the first membrane sleeve 12 is attached to the central tube 16. This initial wrap of permeate carrier sheet 20 supports the membrane sleeve 12 over the holes 22 and provides a path to conduct permeate from the permeate carrier sheet 20 to the holes 22 in the central tube 16.

The permeate carrier sheet 20 also includes a permeate carrier sheet extension 21 that extends away from edge 20a such that edge 20b does not coincide with the closed edge 12b of the membrane sleeve 12 (see FIGS. 3 and 4). The permeate carrier sheet extension 21 may extend distally from edge 20a, past edge 18b of membrane sheet 18. The permeate carrier sheet extension 21 may extend sufficiently past the closed edge 12b of the membrane sleeve 12 to prevent two adjacent membrane sleeves 12 from coming in contact with each other. For example, the permeate carrier sheet extension 21 may extend approximately 1 cm to 10 cm, or 2 cm to 4 cm, past the edge 12b of an adjacent membrane sleeve 12, as will be described further below.

Figure 5A:
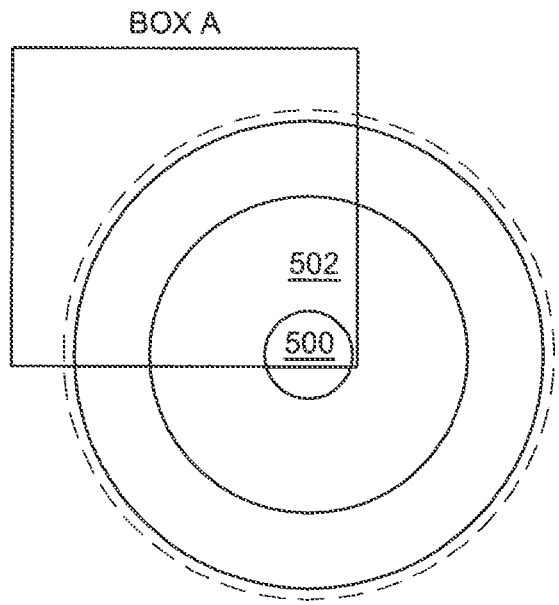
FIG. 5A is a cross-sectional, schematic of the spiral wound membrane element of FIG. 2 taken through line 5-5'.

When forming the membrane element 10, one or more membrane sleeves 12, for example 1 to 40, and one or more of permeate carrier sheets 20, are wrapped around the central tube 16. Each membrane sleeve 12 has an associated permeate carrier sheet 20, for example, the one or more membrane sleeves 12 may be in a one to one ratio with the associated permeate carrier sheet 20. When the membrane element 10 is wrapped and viewed in cross-section, as in FIGS. 5A and 5B, the area proximal to the central tube 16 generally defines an interior region 500 of the membrane element 10. The interior region 500 includes the bore of the central tube 16, the wall of central tube 16 and the one or more layers of permeate carrier that may form an initial wrap around the central tube 16 (as shown in FIG. 4). An intermediary region 502 is formed adjacent the interior region 500 and it comprises one or more wound layers of the plurality of membrane sleeves 12 and the permeate carrier sheet 20. Although not shown in FIG. 5A or 5B, the intermediate region comprises four membrane sleeves 12 and four permeate carrier sheets 20 each extending from the interior region 500 and wrapping around the interior region 500. Adjacent the intermediate layer is a peripheral region 504 of the membrane element 10. The peripheral region 504 comprises the termination point of the edges 12b of the membrane sleeves 12, the termination point of the edges 20b of the permeate carrier sheets 20, the permeate carrier sheet extensions 21 and the outer wrap 42. The peripheral region 504 is generally denoted as the region between the dotted line in FIGS. 5A and 5B and the intermediate region 502.

Figure 5B:
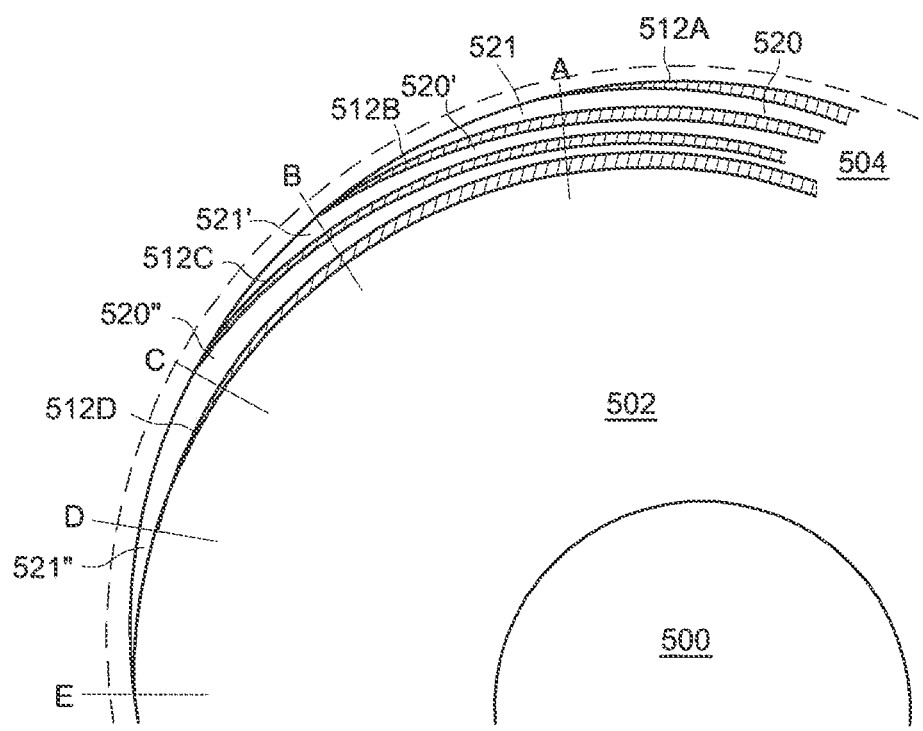
FIG. 5B is a close view of Box A, of FIG. 5A.

After winding the membrane sleeves 12 and the permeate carrier sheets 20 around the central tube 16, the edge 12b of one membrane sleeve 12 does not line up with the edge 12b of the adjacent membrane sleeve. As depicted in FIG. 5B, lines A, B, C and D each approximately indicate the termination point of edge 12b of each of four the membrane sleeves 512A, 512B, 512C and 512D, respectively. For example, the distance between lines A and B and reflects the approximate distance between edge 12b of membrane sleeve 512A and membrane sleeve 512B along the curved surface of the membrane element. This space is caused by the membrane sleeves 12 being generally of the same dimensions, but each of the membrane sleeves 12 is attached at edge 12a at a different point within the interior region 500, either connected with the initial wrap of permeate carrier sheet 20 or directly connected to the central tube 16 (not shown).

When the membrane element 10 is wrapped around the central tube 16, each individual permeate carrier sheet 20 is adjacent a lower membrane sleeve 12 and an upper membrane sleeve 12. The individual permeate carrier sheet 20 is positioned on top of the lower membrane sleeve 12 and below the upper membrane sleeve 12 so that the upper membrane sleeve 12 and the lower membrane sleeve 12 do not come in contact. For example, as shown in FIG. 5B, the permeate carrier 520 is positioned upon lower membrane sleeve 512B and beneath upper membrane sleeve 512A. The permeate carrier sheet extension 521 is shown as extending beyond the edge 12B of the upper membrane sleeve 512A (shown as line A in FIG. 5B) but not extending to meet the edge 12B of the lower membrane sleeve 512B (shown as line B in FIG. 5B). The permeate carrier sheet extensions 21 form an outer permeate carrier layer or series of stripes that at least partially overlie the membrane sleeves 12.

When the membrane element 10 is wrapped around the central tube 16, the permeate carrier sheet 20 provides a first flow path for the permeate stream that proceeds in an inward spiral fashion, around and towards the central tube 16. Referring back to FIG. 5B, some of the permeate that crosses through the membrane sheets of membrane sleeves 512A and 512B will collect and travel within the permeate carrier sheet 520 on the first flow path towards the interior region 500.

The permeate carrier sheet 20 also provides a second flow path for the permeate stream that flows in an outward spiral fashion around, but away from, the central tube 16. Permeate that follows the second flow path travels through the permeate carrier sheet 20 and the permeate carrier sheet extension 21 towards open edge 20b and generally towards the peripheral region 504 of the membrane element 10. In reference to FIG. 5B, some of the permeate that crosses through the membrane sheets 18 of membrane sleeves 512A and 512B will collect and travel within the permeate carrier sheet 520 on the second flow path towards the peripheral region 504. As will be discussed further below, permeate that follows this second permeate flow path is collected from the peripheral region 504 by the anti-telescoping device 40. The glue line 23 ensures that permeate can only exit the permeate carrier sheet 20 by the open edge 20a to follow the first permeate stream to the central tube 16 or by the open edge 20b or the permeate carrier sheet extension 21 to the peripheral region 504 and ultimately to an anti-telescoping device 40.

Further, when the membrane element 10 is wrapped around the central tube 16, the glue line 23 ensures that there is no fluid communication between the outside of edges 11 and 13 of the membrane element 10 and the permeate carrier sheet 20.

As shown in FIGS. 1 and 3, an anti-telescoping device (ATD) 40 is positioned at ends 11 and 13 of the membrane element 10. The ATD 40 prevents the membrane sleeve from being pushed along the length of the center tube 18 by pressure gradients within the spiral wound membrane element 10. The ATD 40 is secured to the central tube 16 by glue, tape an outer wrap 42 or other suitable known methods.

An outer wrap 42 is secured about the membrane element 10 to assist the ATD 40 in the prevention of unwinding during use. The outer wrap 42 is made of materials impermeable to permeate flow, for example a plastic sheet or fiber-reinforced plastics such as fiberglass embedded in epoxy. The outer wrap 42 is in contact with the exterior or outer surface of the permeate carrier sheet extensions 21 and the wrap 42 is sealed at each end to the outside of the ATD 40.

Figure 7:
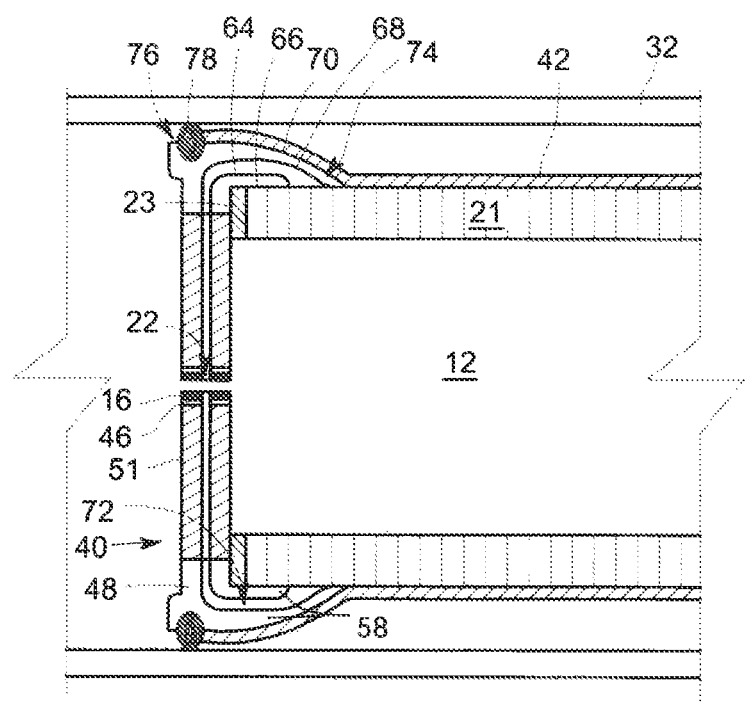
FIG. 7 is a cross-sectional view of the anti-telescopic device taken through line 7-7' of FIG. 1.

The ATD 40 includes an outer annular body 48 that is positioned proximate to the outer most layer of the permeate carrier 20. The outer annular body 48 includes a recess 72 along its circumference that faces the peripheral region 504, including the outer surface of the permeate carrier sheet extensions 21. The outer annular body 48 includes a permeate receiver 58 that extends from the outer annular body 48 between the outer wrap 42 and the outer surface of the permeate carrier sheet extensions 21, as shown in FIG. 7. The permeate receiver 58 includes an inner flange 60 and an outer flange 62, defining a recess 72 therebetween. Each flange, and therefore the recess 72, extends around the circumference of the outer annular body 48. The inner flange 60 has an inner surface 66 and an outer surface 64. Similarly, the outer flange has an inner surface 68 and an outer surface 70. The outer surface 64 of the inner flange 60 is adjacent the outer surface of the permeate carrier sheet extensions 21. The outer surface 70 of the outer flange 62 is adjacent the outer wrap 42.

The outer flange 62 of the permeate receiver 58 extends beyond the inner flange 60, as in FIG. 7. For example, the outer flange 62 includes a leading, beveled edge 74 that extends beyond the inner flange 60 to make contact with the outer surface of the permeate carrier sheet extension 21 to direct the second permeate flow from the peripheral region 504 into the recess 72 of ATD 40. The leading edge 74 also provides a greater surface area for securing ATD 40 to the spiral wound membrane element 10 with outer wrap 42.

Figure 6:
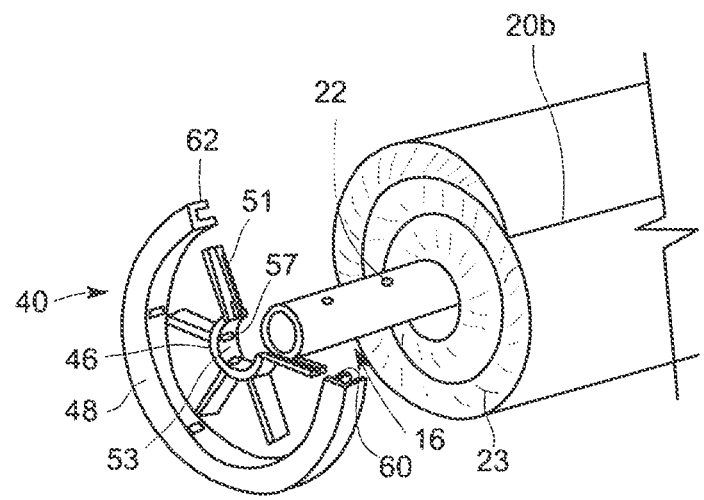
FIG. 6 is a cut-away, exploded, perspective view of an anti-telescoping device for use with the spiral wound membrane element of FIG. 1.

As shown in FIGS. 6 and 7, the ATD 40 also includes an inner annular body 46 with at least one elongate hollow member 51 connecting the two annular bodies 46, 48 of ATD 40. For example, the ATD 40 may resemble a wagon wheel structure, as depicted in FIG. 6, and includes fluid flow channels through the hollow members 51 that allows fluidic communication between the outer annular body 48 and the inner annular body 46.

The inner surface 53 of the inner annular body 46 may be proximal to, connected to or affixed to the outer surface 54 of the central tube 16. The inner annular body may include one or more ports 57 that provide fluid communication across the inner annular body 46 to the central tube 16. The ports 57 provide fluid communication with at least one of the small holes 22 of the central tube 16. Each port 57 is in fluid communication with an elongate hollow member 51 that in turn is in fluid communication with the recess of the outer annular body 48 of ATD 40. Thereby a fluid passage from the peripheral region 504 to the interior region 500 is formed. For example, the flow passage may include the recess 72, elongate hollow member 51, and ports 57 of ATD 40.

Permeate that follows the second permeate flow stream travels spirally towards edge 20b of the permeate carrier sheet extension 21, generally towards the peripheral region 504 and is collected in the outer annular body 48 of the ATD 40 and conducted through the elongate hollow member 51, through the inner annular body 46 and via ports 57, into the central tube 16.

In reference to FIG. 1, a spiral wound membrane module 30 has a membrane element 10 located inside of a pressure vessel 32. The pressure vessel 32 can be a pressure vessel as typically used with spiral wound membrane elements. The pressure vessel 32 has a generally tubular body 34 with an inlet end 36 that is adjacent the input end 11 of the membrane element 10. The pressure vessel 32 also has an outlet end 38, adjacent outlet end 13 of the membrane element and the concentrate end 26 of the central tube 16.

The inlet end 11 and outlet end 13 of the membrane element 10 are sealed and provide fluid communication with the interior of the pressure vessel 32. Peripheral seals may be provided between an outer wrap 42 of the element 10 and the inside of a pressure vessel 32 to prevent fluid communication past a membrane element 10 without passing through its feed spacers 14. Further, glue line 23 prevents direct fluid communication from the inlet end 36 to the permeate carrier sheet 20.

In an additional optional feature, the outer annular body 48 may also include a gland 76 and seal 78, for example an o-ring seal, that may be located opposite to the permeate receiver 58 and the seal 78 forms a seal against the inner surface of the pressure vessel 32. For example, gland 76 and seal 78 may seal against leakage of any permeate and leakage of feed stock from passing around the membrane element 10.

In an additional optional feature, the permeate carrier sheet extension 21 may extend to the edge 12b of the lower membrane sleeve 12 that is adjacent the permeate carrier sheet 20. In reference to FIG. 5B, the permeate carrier sheet 521' includes the permeate carrier sheet extension 521' that extends the distance between lines B and C to meet the outermost edge 512b of membrane sleeve 512C. With this additional optional feature, the outer most layer of permeate carrier 21, as shown in FIG. 7, is not a contiguous layer of permeate carrier sheet 20 in contact with the outer wrap 42. Rather, the permeate carrier sheet extensions 21 form a set of discontinuous bands or stripes of permeate carrier sheet extensions 21 that extend from input end 11 to output end 13 of the membrane element 10 sealed by glue line 23 at each end.

In an additional optional feature, the permeate carrier sheet extension 21 may extend beyond the edge 12b of the lower membrane sleeve 12. In reference to FIG. 5B, the permeate carrier sheet 521" includes the permeate carrier sheet extension 521" that extends beyond the distance between lines C and D and therefore beyond the outermost edge 512b of membrane sleeve 512D. In this optional feature, the permeate carrier sheet extension 521" extends to meet line E which is beyond line D. With this additional optional feature, the individual permeate carrier sheets may extend past the edge 20b of the lower membrane sleeve to come in direct contact with the next permeate carrier sheet. For example, in reference to FIG. 5B, the permeate carrier sheet extension 521' may extend past line C towards line D (not shown) and contact permeate carrier sheet extension 521". Thereby a contiguous outer layer of permeate carrier sheet extensions 21 that have an outer surface in direct contact with the outer wrap 542 is formed, as shown in FIG. 7.

In an additional optional feature, the permeate carrier sheet extension 21 may extend distally from edge 20a to approximately 1 to 5 cm past edge 12b of the adjacent, lower membrane sleeve 12.

In an additional optional feature, more than one membrane element 10 may be located within a given pressure vessel 32. Such multiple membrane elements 10 can be connected in series. The first end 11 of the first membrane element 10 is either sealed, directly exits the pressure vessel 32 or is connected to a fitting that exits the pressure vessel 32 to receive feed stock. If there are multiple elements 10 in a pressure vessel 32, the second end 13 of an upstream element 10 is typically connected to the first end 11 of a downstream element. The second end 13 of the last membrane element 10 in a pressure vessel 32 is either sealed, directly exits the pressure vessel 32 or the end 13 is connected to a fitting that exits the pressure vessel 32. Peripheral seals may be provided between the outer wrap (not shown) of the element 10 and the inside of a pressure vessel 32 to prevent feed water from flowing past an element 10 without passing through the feed spacers 14 of the membrane sleeve 12.

In an additional optional feature, the membrane sleeve 12 is formed by one single membrane sheet that is folded at edge 18a and sealed at edge 18b, resulting in a membrane sleeve, with the feed spacer 14 positioned between the folded membrane. A folded edge 18a may be reinforced with a tape of film.

In an additional optional feature, the permeate carrier sheet extension 21 of the permeate carrier sheet 20 that terminates in the peripheral region 504 of the membrane element 10 may be made of any other filler material, beside typical permeate carrier material such as netting, that is conducive to the flow of permeate fluids therethrough. With such an optional feature, a space containing the filler material within the peripheral region 504 may be formed between the outer surface of the permeate carrier sheet extension 21 and the inner surface of the outer wrap 42. Further optionally, a filler material may be wrapped over the outer surface of the permeate carrier sheet extensions 21. As described above, the permeate receiver of the ATD 40 may extend into this space to direct permeate from the second permeate flow path into the internal flow passage of the ATD 40 and into the central tube 16.

In operation 100, the feedstock solution to be filtered enters through an inlet (not shown) at the inlet end 36 of the pressure vessel 32. Feedstock meets the edge 11 of the membrane element 10. The feed water cannot not enter the permeate carrier sheet from either of the closed edges 20c and 20d. The feed stock enters the membrane sleeve 12 through open edge 12c and flows through the feed spacer 14 and across the inner surface of each membrane sheet 18. Once inside the membrane sleeve 12, the glue line 19 prevents the feed stock from exiting the membrane sleeve 12 at the closed edges 12a and 12b. The resulting direction of feed stock flow is from the open edge 12c to open edge 12d.

While feedstock flows through the membrane sleeve 12, permeate may pass through the inner surface of membrane sheet 18 to the permeate carrier sheet 20 while the passage of dissolved salts or suspended solids or other contaminants may be rejected by the membrane sheet 18 depending on its pore size, referred herein as the reject stream. The reject stream stays on the same side of the membrane sheets 18 as the feedstock, thereby concentrating the feedstock in rejected solutes so that a concentrated reject stream leaves 114 the pressure vessel 32 through a discharge tube (not shown) at the outlet end 38.

As the feed water moves along the inner surface of the membrane sheet 18, permeate passes through the membrane sheet 18 and collects on the opposite side of the membrane sheet 18 from the reject stream. For example, permeate passes through the inner membrane surface and exits the membrane sleeve 12 while the reject stream remains within the membrane sleeve 12 until discharged. The permeate collects within spaces within the permeate carrier sheet 20. The closed edges 20c and 20d of the permeate carrier sheet 20 prevent permeate from exiting the permeate carrier sheet 20 except through the open edges 20a, 20b or the permeate carrier extensions 21. As described above, the flow of permeate fluids along the permeate carrier sheet 20 may occur in one or two, or both, directions.

The first permeate flow path 119 follows the flow path typical for a spiral wound membrane element. In following the first permeate flow path 119, the permeate fluid may flow in a radial path that spirals inwardly 116 towards the central tube 16. Edge 20a provides fluid communication with the holes 22 of central tube 16 so that permeate may collect inside of the central tube 16 and then typically travels in a stream 118 directed from a first end 52 to a second end 54 of the central tube 16.

Permeate fluid also follows the second permeate flow path 120 that is generally in the opposite direction to the first permeate flow path 119. For example, permeate fluid may follow a radial flow path that spirals outwardly, away from the central tube 16 towards the peripheral region 504 of the membrane element 10. Permeate fluid following the second permeate flow path may travel along the permeate sheet 20, away from edge 20a, towards edge 20b. The permeate fluid following the second permeate flow path 120 may travel along and lengthwise, through the one or more of the permeate carrier sheet extensions 21 to be collected within the peripheral region 504 of the membrane element, for example within ATD 40.

It is to be understood that references herein to spiral or radial permeate flow do not exclude the edgewise permeate flow, that is flow in the direction that connects edges 20c and 20d, through the permeate carrier sheet. The two reverse flow paths 119 and 120 may be strictly opposite only in a plane perpendicular to the length of the membrane element 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. A spiral wound membrane element, comprising:
    a central tube;
    one or more membrane sleeves, each sleeve comprising two membrane sheets enclosed at two opposed edges around a feed spacer sheet;
    a permeate carrier sheet in a one to one ratio with the membrane sleeves and attached to the central tube at a first edge opposite a second edge; and
    a seal on a third and fourth edge of the permeate carrier, extending from the first to the second edges
    wherein the one or more membrane sleeves and permeate carrier sheets are wrapped in a spiral and the second edge of each permeate carrier sheet is open and extends beyond one of the membrane sleeves lying over it in a peripheral region of the element such that the permeate carrier is in fluid communication with the central tube and the peripheral region of the membrane element.

2. The spiral wound membrane element of claim 1, further comprising an anti-telescoping device.

3. The spiral wound membrane element of claim 2, further comprising an outer wrap that wraps around the one or more membrane sleeves and the permeate carrier.

4. The spiral wound membrane element of claim 3, wherein the anti-telescoping device includes an interior passage that communicates from the peripheral region of the membrane element to the central tube.

5. The spiral wound membrane element of claim 4, wherein the permeate carrier extends from the second edge beyond the membrane sleeve.

6. The spiral wound membrane element of claim 4, wherein the membrane element is housed within a pressure vessel.

7. A method for filtering a feedstock, the method comprising:
    providing a spiral wound membrane element as in claim 1;
    driving the feedstock in a first direction through the one or more membrane sleeves;
    collecting a reject stream on the first side of the membranes and collecting permeate fluid on a second side of the membranes;
    collecting the reject fluid;
    dividing the permeate fluid into a first permeate stream and a second permeate stream;
    directing the first permeate stream in a second direction that spirals towards and communicates with the central tube;
    directing the second permeate flow in a third direction that spirals towards and communicates with the peripheral region;
    collecting the permeate from the central tube and the peripheral region.

8. The method of claim 7, wherein the first direction is co-axial with the central axis and the second direction is substantially normal to the first direction and approaching the central axis.

9. The method of claim 8, wherein the third direction is substantially parallel to the second direction and away from the central axis.

10. The method of claim 9, wherein the second permeate flow flows from peripheral region to an anti-telescoping device.

11. The method of claim 10, wherein the second permeate flows from the anti-telescoping device to the central tube.

12. The method of claim 11, wherein the membrane is selected from a group of membranes suitable for microfiltration, ultrafiltration, nanofiltration and reverse osmosis.

* * * * *